US007483912B2

(12) United States Patent
Tanaka

(10) Patent No.: US 7,483,912 B2
(45) Date of Patent: Jan. 27, 2009

(54) INFORMATION RETRIEVAL/INFORMATION RETRIEVAL RESULT PROVIDING SYSTEM, INFORMATION RETRIEVAL/INFORMATION RETRIEVAL RESULT PROVIDING METHOD AND STORAGE MEDIUM RECORDING METHOD PROGRAM

(75) Inventor: Masashi Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 684 days.

(21) Appl. No.: 11/094,205

(22) Filed: Mar. 31, 2005

(65) Prior Publication Data

US 2005/0171957 A1    Aug. 4, 2005

Related U.S. Application Data

(62) Division of application No. 10/162,880, filed on Jun. 6, 2002, now Pat. No. 7,233,941.

(30) Foreign Application Priority Data

Jun. 8, 2001    (JP)    ............... 2001-174761

(51) Int. Cl.
    *G06F 17/00*    (2006.01)
(52) U.S. Cl. .................. 707/102; 707/100; 707/101; 707/9
(58) Field of Classification Search .............. None
    See application file for complete search history.

(56) References Cited

U.S. PATENT DOCUMENTS

| | | | |
|---|---|---|---|
| 6,157,924 A | 12/2000 | Austin | |
| 6,202,087 B1 | 3/2001 | Gadish | |
| 6,370,527 B1 | 4/2002 | Singhal | |
| 6,473,794 B1 * | 10/2002 | Guheen et al. | ............ 709/223 |
| 6,536,037 B1 * | 3/2003 | Guheen et al. | ............ 717/151 |
| 6,606,654 B1 | 8/2003 | Borman et al. | |

(Continued)

FOREIGN PATENT DOCUMENTS

JP    09-259250    10/1997

(Continued)

OTHER PUBLICATIONS

Japanese Office Action dated Jun. 30, 2005, with partial English Translation.

(Continued)

*Primary Examiner*—Sana Al-Hashemi
(74) *Attorney, Agent, or Firm*—McGinn IP Law Group, PLLC

(57) ABSTRACT

To enable easily obtaining information retrieval result once retrieved by user without performing retrieval again, an information retrieval/information retrieval result providing system includes a network, a user terminal connected to the network, an information retrieval server, information storage server and information sending servers, the information retrieval server and the information storage server being located adjacent with each other. The information retrieval server receives information retrieval request from the user terminal and collecting information including the keyword from a plurality of information sending servers as the information retrieval result, stores storing the information retrieval result depending upon storage request from the user terminal and managing storage period, and transmits and receives electronic mail. The information storage server stores and deletes the information retrieval result under control of the information retrieval server.

30 Claims, 11 Drawing Sheets

U.S. PATENT DOCUMENTS 6,658,414 B2    12/2003   Bryan et al.
6,745,195 B1 *  6/2004    Kornfein et al. ............ 707/102
7,315,826 B1 *  1/2008    Guheen et al. ................. 705/7

FOREIGN PATENT DOCUMENTS

| | | |
|---|---|---|
| JP | 11-085792 | 3/1999 |
| JP | 2000-122957 | 4/2000 |
| JP | 2000-137725 | 5/2000 |

OTHER PUBLICATIONS

Japanese Office Action dated Sep. 20, 2005 (with partial English translation).

* cited by examiner

FIG. 3

REGISTER INFORMATION RETRIEVAL AND LOGIN SCREEN

INFORMATION COLLECTING REQUEST ITEM

> SPECIFICATION AND FUNCTION INFORMATION RELATING TO MOTHER BOARD FOR ASSEMBLING OWN PERSONAL COMPUTER

SEARCH LEVEL

- ○ REPORT LEVEL
- ○ URL LEVEL AND SUMMARY OF EACH URL
- ○ COLLECT ONLY URL

INFORMATION RETRIEVAL RESULT PROVIDING FORMAT

○ HTML  ○ PDF  ○ DOC  ○ EXCEL  ○ TXT
○ OTHER [ ]

SEARCH RANGE

○ INLAND  ○ INCLUDING ABROAD  ○ AREA(SPECIFIED CITY) [ ]

SEARCH DATE

YYY / MM / DD [ ] / [ ] / [ ]

INFORMATION STORAGE PERIOD

YYY / MM / DD [ ] / [ ] / [ ]

INFORMATION ACCESS TERMINAL

○ PC  ○ MOBILE TERMINAL  ○ CELLULAR TELEPHONE

NAME, CARD COMPANY AND CREDIT CARD NUMBER

[ ]  [ ]  [ ]

e-mail Address [ ] and [ ]

FIG. 8

REGISTER INFORMATION RETRIEVAL AND LOGIN SCREEN

51 — INFORMATION COLLECTING REQUEST ITEM

SPECIFICATION AND FUNCTION INFORMATION RELATING TO MOTHER BOARD FOR ASSEMBLING OWN PERSONAL COMPUTER

52 — SEARCH LEVEL

- ○ REPORT LEVEL
- ○ URL LEVEL AND SUMMARY OF EACH URL
- ○ COLLECT ONLY URL

53 — INFORMATION RETRIEVAL RESULT PROVIDING FORMAT

- ○ HTML  ○ PDF  ○ DOC  ○ EXCEL  ○ TXT
- ○ OTHER [ ]

54 — SEARCH RANGE

○ INLAND  ○ INCLUDING ABROAD  ○ AREA(SPECIFIED CITY)[ ]

55 — SEARCH DATE

YYY / MM / DD [ ] / [ ] / [ ]

56 — INFORMATION STORAGE PERIOD

YYY / MM / DD [ ] / [ ] / [ ]

70 — INFORMATION STORAGE POSITION

- ○ POSITION A  ○ POSITION B  ○ POSITION C
- ○ POSITION D  ○ POSITION E

57 — INFORMATION ACCESS TERMINAL

○ PC  ○ MOBILE TERMINAL  ○ CELLULAR TELEPHONE

58 — NAME, CARD COMPANY AND CREDIT CARD NUMBER

[ ]  [ ]  [ ]

59 — e-mail Address [ ] and [ ]

| ACCOUNT (COST) | SEARCH PERIOD | SEARCH RESULT INFORMATION AMOUNT | SEARCH TECHNICAL ITEM | SEARCH AREA | SEARCH RESULT EDIT (MANPOWER) | ATTACHED FILE (REFERENCE FILE) | SEARCH RESULT EDITION (EXPERTISE) | SEARCH STORAGE PERIOD | SEARCH STORAGE POSITION |
|---|---|---|---|---|---|---|---|---|---|
| HIGH | SHORT | LARGE | NEW TECHNOLOGY | WIDE AREA (ABROAD) / MEDIUM AREA (LIMITED AREA IN ABROAD) | REPORT / PDF / DOC / EXCEL / TEXT | MOVING PICTURE / AUDIO / STILL IMAGE / OTHER | INVESTMENT | LONG PERIOD | DEPEND ON INSTALLATION POSITION OF INFORMATION STORAGE SERVER |
| LOW | LONG | SMALL | EXISTING TECHNOLOGY | NARROW AREA (INLAND / ASIA) | ONLY URL | NO | NON-INVESTMENT | SHORT PERIOD | |

INFORMATION RETRIEVAL/INFORMATION RETRIEVAL RESULT PROVIDING SYSTEM, INFORMATION RETRIEVAL/INFORMATION RETRIEVAL RESULT PROVIDING METHOD AND STORAGE MEDIUM RECORDING METHOD PROGRAM

The present Application is a Divisional Application of U.S. patent application Ser. No. 10/162,880 filed on Jun. 6, 2002 now U.S. Pat. No. 7,233,941.

BACKGROUND OF THE INVENTION

1. Field of the Invention

The present invention relates generally to an information retrieval/information retrieval result providing system and an information retrieval/information retrieval result providing method and a storage medium recording method program. More particularly, the invention relates to a system, a method and a storage medium recognizing a search request item of user, a search level, an information retrieval result providing method, a search range, an information storage period, an information access terminal and information storage site, performing information retrieval from an information sending server presenting on a network, such as internet or the like, processing the information retrieval result, storing for a given period and providing information retrieval result to the user.

2. Description of the Related Art

Conventionally, as an information retrieval method and an information retrieval result providing method for retrieving and providing information presented on the network, utilizing network on the internet, there has been known a providing method of performing retrieval (searching) information on the information sending server on the network by information retrieval server depending upon a demand of information retrieval for the predetermined information retrieval server from the user and transmitting the information retrieval result at a timing where information retrieval is performed. Here, the information retrieval server provides URL (Uniform Resource Locator) of the information sending server presenting the information matching with the retrieval item demanded by the user, and summary (information summary) of information, as information retrieval result.

FIG. 11 is an illustration showing the conventional information retrieval system and information retrieval result providing method. The conventional information retrieval system and the information retrieval result providing method are constructed with a user terminal 210, an information sending server (1) 230, an information sending server (2) 231, an information sending server (3) 232 established and managed by business entities, organizations, individuals for the purpose of presenting information, an information retrieval server (1) 220 and an information retrieval server (2) 221 established and managed by business entities and organizations for the purpose of retrieval of information presented on the network, and a network 200 connecting respective components with each other.

The user accesses the information retrieval server (1) 220 or information retrieval server (2) 221 via the user terminal 210. Here, it is assumed that the user selects the information retrieval server (1) 220 as the information retrieval server to request information retrieval. The user designates keyword, term or the like of the information retrieval item on a display screen of the user terminal 210. The designated keyword or the like is transmitted (201) to the information retrieval server (1) 220 via the network 200.

The information retrieval server (1) 220 receiving the information retrieval request recognizes keyword, term and so forth input by the user to the user terminal 210 to perform collection of information from the information sending server (1) 230, the information sending server (2) 231 and information sending server (3) 232 established on the network.

The information retrieval server (1) 220 recognizes presence of information containing the keyword designated by user in the information sending server (1) 230 and the information sending server (2) 231 and obtains (202, 203) of URL and information summary of the information sending server (1) 230 and the information sending server (2) 231.

The information retrieval server (1) 220 completed collection of information transmits (205) information retrieval/collection result to the user terminal 210. Then, the user obtains and accesses demanded information via the user terminal 210.

In the conventional information retrieval system, depending upon mechanism of web browser used for accessing information retrieval demand and information retrieval result, the information retrieval server merely provides the information retrieval result by temporarily displaying the Web browser and is designed to perform process of providing the information retrieval demand and the information retrieval result by synchronizing (mutually transmitting and receiving data) the user terminal and the information retrieval server. Accordingly, in the conventional information retrieval and providing method, when the user requires information once retrieved in the past, information retrieval has to be newly performed to repeat operation of process procedure for obtaining retrieval information to be impossible to effectively use the information result, such as transfer of the retrieved information to the other party.

On the other hand, since the conventional information retrieval system is designed to constantly provide information retrieval result from the information retrieval server in response to the demand of the retrieval information from the user, the user is required access period due to retrieval period every time in repeated access to the information retrieval result, and is also required access period depending upon the location of the user terminal due to distance and crowded condition to the information retrieval server on the network.

Furthermore, in the conventional information retrieval system, a method to display only URL of the retrieval result and summary of information to be presented the URL has been taken. When broadband image information, audio information, special format data and so forth are present in the URL, checking and access of such data is impossible unless the user terminal has a function for reproducing such data. Namely, in diversification of functions of the user terminals, most of users cannot access the information retrieval result equally.

On the other hand, in the conventional information retrieving system, the information retrieval server takes all information sending server established on the network. Therefore, when huge amount of information retrieval results are presented, user has to spend large amount of time for obtaining truly required information. For example, when several hundreds of relevant URLs are obtained as a result of the retrieving on the network by the information retrieval server, the user has to perform troublesome checking process in order to narrow down to necessary minimum number of URLs containing required information out of several hundreds of URLs.

In the conventional information retrieval system, access method only by the Web browser is employed to operate the user terminal and the information retrieval server in synchronous manner while the information retrieval result is accessed and displayed by the Web browser. Then, the user terminal is in the state where retrieval and information access are active, the user is not possible to even store the information retrieval result from the user terminal to other server or so forth.

SUMMARY OF THE INVENTION

It is an object of the present invention to enable easily obtaining information retrieval result once retrieved by user without performing retrieval again.

Another object of the present invention is to enable effective use of the information retrieval result retrieved by the user.

A further object of the present invention is to reducing access load when user accesses the information retrieval result by providing the information retrieval result in information access format adapting to the user terminal.

A still further object of the present invention is to provide information retrieval result with narrowing down to only information matching with information required by the user.

A yet further object of the present invention is to enable the user to obtain the information retrieval result by way of an electronic medium or a paper.

A further object of the present invention is to realize new business consisted of a user terminal, an information retrieval server and an information storage server.

An information retrieval/information retrieval result providing system and an information retrieval/information retrieval result providing method enable user obtaining of information retrieval result in asynchronous manner to an information retrieval server by temporarily storing the information retrieval result from the information retrieval server to the user in an information storage server.

More particularly, the information retrieval server and the information storage server are linked for storing the information retrieval result (20 and 21 of FIG. 1). In the alternative, the information storage servers are distributingly arranged on the network in order to store the information retrieval result (21 and 22 of FIG. 6). On the other hand, information retrieval/information retrieval result providing system includes means for declaring (designating) the information storage period (56 of FIGS. 3 and 8) upon requesting information retrieval (search) to the information retrieval server by the user (step A4 of FIG. 2 and step A22 of FIG. 7), means for declaring (designating) updating of the information storage period (64 of FIG. 5) upon obtaining the information retrieval result from the information retrieval server and the information storage server for accessing to the information retrieval result by the user (step B4 of FIGS. 4 and 9), and means for performing updating process of the storage period of the information retrieval result data of the information retrieval server and the information storage server (step B20 of FIGS. 4 and 9) according to updating (63 of FIG. 5 and 56 of FIG. 8) of the information storage period.

Furthermore, the information retrieval/information retrieval result providing system and the information retrieval/information retrieval result providing method according to the present invention permits the user to effectively use the information retrieval result.

More particularly, the information retrieval/information retrieval result providing system has information storage servers on the network (21 of FIG. 1 and 21 and 22 of FIG. 6). On the other hand, the information retrieval/information retrieval result providing system includes means for declaring (designating) the search level (52 of FIGS. 3 and 8) upon requesting search to the information retrieval server by the user (step A4 of FIG. 2 and step S22 of FIG. 7), and means for declaring (designating) information retrieval result providing format (53 of FIGS. 3 and 8). Also, the information retrieval/ information retrieval result providing system has the information storage server for permitting access to the information retrieval result by the user, means for declaring (designating) access and delivery of the information retrieval result (63 of FIG. 5) upon obtaining information retrieval result from the information storage server (step B4 of FIGS. 4 and 9) and delivery means (steps B21 and B22 of FIGS. 4 and 9) from the information center (40 of FIG. 1) to the user.

Furthermore, the information retrieval/information retrieval result providing system and the information retrieval/information retrieval result providing method according to the present invention can reduce an access load by processing upon accessing the information retrieval result the information accessing format adapted to the user terminal to be used by the user.

More particularly, the information retrieval/information retrieval result providing system has means for declaring (designating) the search level (52 of FIGS. 3 and 8) upon requesting search for the information retrieval server by the user (step A4 of FIG. 2 and step A22 of FIG. 7) and means for declaring (designating) the information retrieval result providing format (53 of FIGS. 3 and 8), means for declaring (designating) kind of the information access terminal by the user (57 of FIGS. 3 and 8), and means for processing the information retrieval result after information retrieval by the information retrieval server (step A9 of FIGS. 2 and 7).

Furthermore, the information retrieval/information retrieval result providing system and the information retrieval/information retrieval result providing method according to the present invention can provide only information adapting to information demanded by the user.

More particularly, the information retrieval/information retrieval result providing system has means for declaring (defining) the search level (52 of FIGS. 3 and 8) upon requesting search for the information retrieval server by the user (step A4 of FIG. 2 and A22 of FIG. 7) and means for declaring (designating) search range (54 of FIGS. 3 and 8).

Also, the information retrieval/information retrieval result providing system and the information retrieval/information retrieval result providing method according to the present invention permits the user to access to the information retrieval result at anywhere on the network.

More particularly, information retrieval/information retrieval result providing system includes information storage servers (21 and 22 of FIG. 6) distributingly arranged on the network, means for designation storage position of the information retrieval result (70 of FIG. 8) upon requesting search to the information retrieval server by the user (step A22 of FIG. 7), means for transmitting data to the information storage server after processing of the information retrieval result by the information retrieval server (step A23 of FIG. 7), and means for storing the information retrieval result transmitted from the information retrieval server in the information server (step A24 of FIG. 7).

Furthermore, the information retrieval/information retrieval result providing system and the information retrieval/information retrieval result providing method according to the present invention performs user authentication and accounting process and performs information retrieval and information storage.

More particularly, the information retrieval/information retrieval result providing system has means for inputting a credit card number (58 of FIGS. 3 and 8) upon requesting search for the information retrieval server by the user (step A4 of FIG. 2 and step A22 of FIG. 7), user authentication means (steps A7 and A10 of FIGS. 2 and 7, step B5 of FIGS. 4 and 9 and step B33 of FIG. 9), and account table (80 of FIG. 10) for accounting process.

According to the first aspect of the present invention, an information retrieval/information retrieval result providing system comprises:

a network, a user terminal connected to the network, an information retrieval server, information storage server and information sending servers, the information retrieval server and the information storage server being located adjacent with each other;

the user terminal including means for accessing the information retrieval server or the information storage server, means for transmitting information retrieval request to the information retrieval server with a keyword for information retrieval, means for transmitting a storage request of information retrieval result to the information storage server, means for accessing information retrieval result provided by the information retrieval server or information storage server and means for transmitting and receiving an electronic mail;

the information retrieval server including means for receiving information retrieval request from the user terminal and collecting information including the keyword from a plurality of information sending servers as the information retrieval result, means for storing the information retrieval result depending upon storage request from the user terminal and managing storage period, and means for transmitting and receiving electronic mail; and the information storage server including means for storing and deleting the information retrieval result under control of the information retrieval server.

According to the second aspect of the present invention, an information retrieval/information retrieval result providing system comprises a network, a user terminal connected to the network, an information retrieval server, a plurality of information storage servers, a plurality of information sending servers, a plurality of storage servers being distributed over the network;

the user terminal including means for accessing the information retrieval server or the information storage server, means for transmitting information retrieval request to the information retrieval server with a keyword for information retrieval, means for transmitting a storage request of information retrieval result to the information storage server, means for accessing information retrieval result provided by the information retrieval server or information storage server and means for transmitting and receiving an electronic mail;

the information retrieval server including means for receiving information retrieval request from the user terminal and collecting information including the keyword from a plurality of information sending servers as the information retrieval result, means for storing the information retrieval result depending upon storage request from the user terminal and managing storage period, and means for transmitting and receiving electronic mail; and the information storage server including means for storing and deleting the information retrieval result under control of the information retrieval server and means for transmitting the information retrieval result to the user terminal.

According to the third aspect of the present invention, an information retrieval server for information retrieval/information retrieval result providing connected to a network, to which a user terminal, information sending servers and one or more information storage servers are connected, comprises:

means for receiving information retrieval request and storage request of information retrieval result by a keyword for information retrieval from the user terminal;

means for collecting information containing keyword from a plurality of information sending servers as information retrieval result;

means for storing the information retrieval result in the information storage server and managing a storage period according to storage request of the information retrieval result; and means for transmitting and receiving an electronic mail to and from the user terminal.

The information storage server is a plurality of information storage servers distributed on the network, and the storage request of the information retrieval result includes designation of position of information storage server designated by the user, the information retrieval result is transmitted to the designated information storage server for remote management of the information storage server.

The information retrieval server stores the information storage result in the information storage server according to designation of storage period of the information retrieval result from the user terminal. The information retrieval server further comprises means for performing user authentication and issues a user ID and password for the user authentication by means for transmitting and receiving the electronic mail. The information retrieval server transmits information retrieval completion notice to the user terminal by the means for transmitting and receiving electronic mail. The information retrieval server transmits the information retrieval result to the user terminal by the means for transmitting and receiving electronic mail. The information retrieval server has user interface means for processing the information retrieval result by clerical staff or staff of expertise and transferring to user by facsimile or posting. The information retrieval server further comprises means for processing the information retrieval result and means for processing or converting the information retrieval result automatically designated file format according to a demand of the user. The information retrieval server further comprises accounting means for deriving an accounting information by an accounting process and an accounting method defining table having information for accounting process. In the alternative, the information storage server further comprises accounting means for deriving an accounting information by an accounting process, and an accounting method defining table having information of information retrieval period, information amount of information retrieval result, technical item of information retrieval, information retrieval area, editing manpower of information retrieval result, presence or absence of attached file, editing expertise of information retrieval result, storage period of information storage result and storage position of information retrieval result.

According to the fourth aspect of the present invention, an information retrieval/information retrieval result providing method comprises:

step of accessing an information retrieval server of an information center on a network by operation of a user terminal by a user;

step of recognizing access from the user terminal by the information retrieval server and transmitting an information retrieval registration screen for permitting the user to request information retrieval by inputting information retrieval items including keyword for information retrieval, presence and absence of storage request of information retrieval result and so on, to the user terminal;

step of receiving and displaying the information retrieval registration screen by the user terminal;

step of login to the information retrieval server by transmitting the information retrieval items input to the user terminal by user operation to the information retrieval server;

step of log-out of user terminal in response to completion of registration of information retrieval request of user by the information retrieval server;

step of cutting off a login session with the user terminal by the information retrieval server;

step of recognizing information retrieval items transmitted from the user terminal and issuing a user ID and a password for registered user by the information retrieving server;

step of performing information retrieval for the information sending server on the network with reference to the information retrieval items by the information retrieval server;

step of processing the information retrieval result by the information center after information retrieval by the information retrieval server;

step of storing information retrieval result or information after processing in the information storage server;

step of performing accounting process for the user by the information retrieval server;

step of issuing information retrieval completion notice to the user by the information retrieval server;

step of accessing to the information retrieval server of the information center on the network by operation of a user terminal by a user;

step of recognizing access from the user terminal and transmitting an information retrieval result obtaining screen for performing information retrieval result obtaining demand by inputting information retrieval obtaining items including the user ID, the password, access and transmission request and so forth to the user terminal by the information retrieval server;

step of receiving an information retrieval result obtaining screen and displaying it by the user terminal;

step of log-in to the information retrieval server and the information storage server by transmitting information retrieval obtaining item input by user operation to the user terminal to the information retrieval server;

step of performing user authentication by the transmitted user ID and the password by the information retrieval server and the information storage server;

step of performing accessing process by transmission or delivery of the information retrieval result to the user terminal by the information retrieval server and transmitting accounting information;

step of displaying information retrieval result and accounting information by the user terminal;

step of log-out with notifying completion to the information retrieval server after demanding access display or delivery of the information retrieval result by user operation of the user terminal; and step of cutting off login session with the user terminal by the information retrieval server and the information storage server in the information center.

According to the fifth aspect of the invention, an information retrieval/information retrieval result providing method comprises:

step of accessing an information retrieval server of an information center on a network by operation of a user terminal by a user;

step of recognizing access from the user terminal by the information retrieval server and transmitting an information retrieval registration screen for permitting the user to request information retrieval by inputting information retrieval items including keyword for information retrieval, presence and absence of storage request of information retrieval result and designation of information storage server or storage area for storing information storage result, to the user terminal;

step of receiving and displaying the information retrieval registration screen by the user terminal;

step of login to the information retrieval server by transmitting the information retrieval items input to the user terminal by user operation to the information retrieval server;

step of log-out of user terminal in response to completion of registration of information retrieval request of user by the information retrieval server;

step of cutting off a login session with the user terminal by the information retrieval server;

step of recognizing information retrieval items transmitted from the user terminal and issuing a user ID and a password for registered user by the information retrieving server;

step of performing information retrieval for the information sending server on the network with reference to the information retrieval items by the information retrieval server;

step of processing the information retrieval result by the information center after information retrieval by the information retrieval server;

step of storing information retrieval result or information after processing in the in the formation storage server designated by the user;

step of performing accounting process for the user by the information retrieval server;

step of issuing information retrieval completion notice to the user by the information retrieval server;

step of accessing to the information retrieval server of the information center on the network by operation of a user terminal by a user;

step of recognizing access from the user terminal and transmitting an information retrieval result obtaining screen for performing information retrieval result obtaining demand by inputting information retrieval obtaining items including the user ID, the password, access and transmission request and so forth to the user terminal by the information retrieval server;

step of login to the information retrieval server and the information storage server by transmitting information retrieval obtaining item input by user operation to the user terminal to the information retrieval server;

step of performing user authentication by the transmitted user ID and the password by the information retrieval server;

step of performing user authentication by the transmitted user ID and the password by the information storage server;

step of performing accessing process by transmission or delivery of the information retrieval result to the user terminal by the information retrieval server and transmitting URL of the information storage server and accounting information;

step of displaying the URL of the information storage server and accounting information by the user terminal;

step of accessing the information storage server by user operation to the user terminal;

step of performing user authentication by the information storage server;

step of transmitting the information retrieval result to the user terminal by the information storage server;

step of log-out with notifying completion to the information retrieval server after demanding access display or delivery of the information retrieval result by user operation of the user terminal; and step of cutting off login session with the user terminal by the information retrieval server and the information storage server in the information center.

The information retrieval items may include an item for designating a storage period upon demanding temporary storage of the information retrieval result and for forth, the information retrieval result obtaining item includes an item for requesting updating of the storage period and an item for requesting deletion of the information retrieval result and so forth, the method may further comprise:

step of performing updating process of storage if the information retrieval result or the like with respect to request for varying the storage period by the information retrieval server;

step of deleting the information retrieval result or the like for the request of deletion of the information retrieval result or the like by the information retrieval server; and step of performing storage/deletion of the information retrieval result or the like by the information storage server.

The information retrieval server may use the electronic mail in issuing the user ID and the password for the registered user. The information retrieval item may include an item of selection of search range and/or search level of the information retrieval, and the information retrieval server may make reference to the information retrieval item designated by the user to perform information retrieval on a plurality of information sending servers established on the network. The information retrieval item may include information retrieval result providing format designated by the user and information accessing terminal designating item, and the information retrieving server may make reference to the information retrieving result providing format and the information accessing terminal to process the information retrieval result. The process of the information retrieval result may include an automatic process by the information retrieval server and a process by staff assigned to the information center. Accounting process of the information retrieval server may include estimating the account using an accounting method table having information for accounting process.

The information retrieval server may include an accounting information by an accounting process, and an accounting method defining table having information of information retrieval period, information amount of information retrieval result, technical item of information retrieval, information retrieval area, editing manpower of information retrieval result, presence or absence of attached file, editing expertise of information retrieval result, storage period of information storage result and storage position of information retrieval result. The information retrieval completion notice from the information retrieval server to the user may be performed by an electronic mail. The information retrieval result obtaining screen may include an item for setting a user ID and a password notified from the information retrieval server upon demanding information retrieval and an item of transmission and devŸlivery request of the information retrieval result. The information retrieval result obtaining items may include a delivery request item as delivery request of the information retrieval result with conversion into an electronic mail, paper, facsimile or CD-ROM, when requested medium is the electronic mail, the method further comprises step of sending the electronic mail to the electronic mail address of the user by the information retrieval server, and when requested medium is paper, facsimile or CD-ROM, the method further comprises step of delivery of the information retrieval result by post mail, facsimile or direct delivery. The information retrieval result obtaining item may also include an item of designating an individual name for user authentication and accounting process, a card company and a card number. The information retrieval result obtaining item may include item of registering an electronic mail address of the user, registration of the electronic mail address is used for notification of a user ID and password, information retrieval completion notice, and delivery of electronic mail of the information retrieval result.

The network may be an internet.

According to the sixth aspect of the present invention, a storage medium storing a computer program implementing an information retrieval/information retrieval result providing method, the program comprises:

step of accessing an information retrieval server of an information center on a network by operation of a user terminal by a user;

step of recognizing access from the user terminal by the information retrieval server and transmitting an information retrieval registration screen for permitting the user to request information retrieval by inputting information retrieval items including keyword for information retrieval, presence and absence of storage request of information retrieval result and so on, to the user terminal;

step of receiving and displaying the information retrieval registration screen by the user terminal;

step of login to the information retrieval server by transmitting the information retrieval items input to the user terminal by user operation to the information retrieval server;

step of log-out of user terminal in response to completion of registration of information retrieval request of user by the information retrieval server;

step of cutting off a login session with the user terminal by the information retrieval server;

step of recognizing information retrieval items transmitted from the user terminal and issuing a user ID and a password for registered user by the information retrieving server;

step of performing information retrieval for the information sending server on the network with reference to the information retrieval items by the information retrieval server;

step of processing the information retrieval result by the information center after information retrieval by the information retrieval server;

step of storing information retrieval result or information after processing in the information storage server;

step of performing accounting process for the user by the information retrieval server;

step of issuing information retrieval completion notice to the user by the information retrieval server;

step of accessing to the information retrieval server of the information center on the network by operation of a user terminal by a user;

step of recognizing access from the user terminal and transmitting an information retrieval result obtaining screen for performing information retrieval result obtaining demand by inputting information retrieval obtaining items including the user ID, the password, access and transmission request and so forth to the user terminal by the information retrieval server;

step of login to the information retrieval server and the information storage server by transmitting information retrieval obtaining item input by user operation to the user terminal to the information retrieval server;

step of performing user authentication by the transmitted user ID and the password by the information retrieval server and the information storage server;

step of performing accessing process by transmission or delivery of the information retrieval result to the user terminal by the information retrieval server and transmitting accounting information;

step of displaying information retrieval result and accounting information by the user terminal;

step of log-out with notifying completion to the information retrieval server after demanding access display or delivery of the information retrieval result by user operation of the user terminal; and step of cutting off login session with the user terminal by the information retrieval server and the information storage server in the information center.

According to the seventh aspect of the present invention, a storage medium storing a computer program implementing an information retrieval/information retrieval result providing method, the program comprises:

step of accessing an information retrieval server of an information center on a network by operation of a user terminal by a user;

step of recognizing access from the user terminal by the information retrieval server and transmitting an information retrieval registration screen for permitting the user to request information retrieval by inputting information retrieval items including keyword for information retrieval, presence and absence of storage request of information retrieval result and designation of information storage server or storage area for storing information storage result, to the user terminal;

step of receiving and displaying the information retrieval registration screen by the user terminal;

step of login to the information retrieval server by transmitting the information retrieval items input to the user terminal by user operation to the information retrieval server;

step of log-out of user terminal in response to completion of registration of information retrieval request of user by the information retrieval server;

step of cutting off a login session with the user terminal by the information retrieval server;

step of recognizing information retrieval items transmitted from the user terminal and issuing a user ID and a password for registered user by the information retrieving server;

step of performing information retrieval for the information sending server on the network with reference to the information retrieval items by the information retrieval server;

step of processing the information retrieval result by the information center after information retrieval by the information retrieval server;

step of storing information retrieval result or information after processing in the in the formation storage server designated by the user;

step of performing accounting process for the user by the information retrieval server;

step of issuing information retrieval completion notice to the user by the information retrieval server;

step of accessing to the information retrieval server of the information center on the network by operation of a user terminal by a user;

step of recognizing access from the user terminal and transmitting an information retrieval result obtaining screen for performing information retrieval result obtaining demand by inputting information retrieval obtaining items including the user ID, the password, access and transmission request and so forth to the user terminal by the information retrieval server;

step of login to the information retrieval server and the information storage server by transmitting information retrieval obtaining item input by user operation to the user terminal to the information retrieval server;

step of performing user authentication by the transmitted user ID and the password by the information retrieval server;

step of performing user authentication by the transmitted user ID and the password by the information storage server;

step of performing accessing process by transmission or delivery of the information retrieval result to the user terminal by the information retrieval server and transmitting URL of the information storage server and accounting information;

step of displaying the URL of the information storage server and accounting information by the user terminal;

step of accessing the information storage server by user operation to the user terminal;

step of performing user authentication by the information storage server;

step of transmitting the information retrieval result to the user terminal by the information storage server;

step of log-out with notifying completion to the information retrieval server after demanding access display or delivery of the information retrieval result by user operation of the user terminal; and step of cutting off login session with the user terminal by the information retrieval server and the information storage server in the information center.

In the present invention, the information storage servers are arranged on the network. The user declares the information storage period. Therefore, the user is not required to perform retrieval again for the same information and is not required to access the information retrieval result in synchronism with the information retrieval server.

Furthermore, in the present invention, the search level and the search range are declared upon demanding information retrieval. Therefore, the user can obtain necessary minimum information retrieval without accessing the large amount of information retrieval result.

Also, in the present invention, the search level, the information retrieval result providing format and the information retrieval result delivery are declared upon demanding the information retrieval. Then, the information retrieval result is processed by the information retrieval server. Therefore, the user may eliminate waste in information retrieval among the information retrieval result and waste in information retrieval result.

Furthermore, in the present invention, the information retrieval servers are distributed on the network. The user may declare information storage position. Therefore, the user is not required to care about accessing site and accessing timing of the information retrieval result.

Also, in the present invention, upon demanding information retrieval, the kind of the information access terminal different in function from the information retrieval result providing format may be declared. Therefore, upon accessing the information retrieval result by the user, the user is not required to care about the function of the own terminal.

In addition, in the present invention, user authentication and accounting process with reference to the accounting system may be executed. Therefore, information retrieval/information retrieval result providing system may be established as new business.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings:

FIG. 3 is an illustration showing an example of a display screen to he displayed on the user terminal upon demanding information retrieval in the first embodiment of the present invention;

FIG. 8 is an illustration showing an example of a display screen to he displayed on the user terminal upon demanding information retrieval in the second embodiment of the present invention;

FIG. 10 is a block diagram of a table to be made reference to in operation of the embodiment of the present invention.

DESCRIPTION OF THE PREFERRED EMBODIMENT

The present invention will be discussed hereinafter in detail in terms of the preferred embodiments of information retrieval/information retrieval result providing system, and information retrieval/information retrieval result providing method of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscurity of the present invention.

First Embodiment

Figure 1:
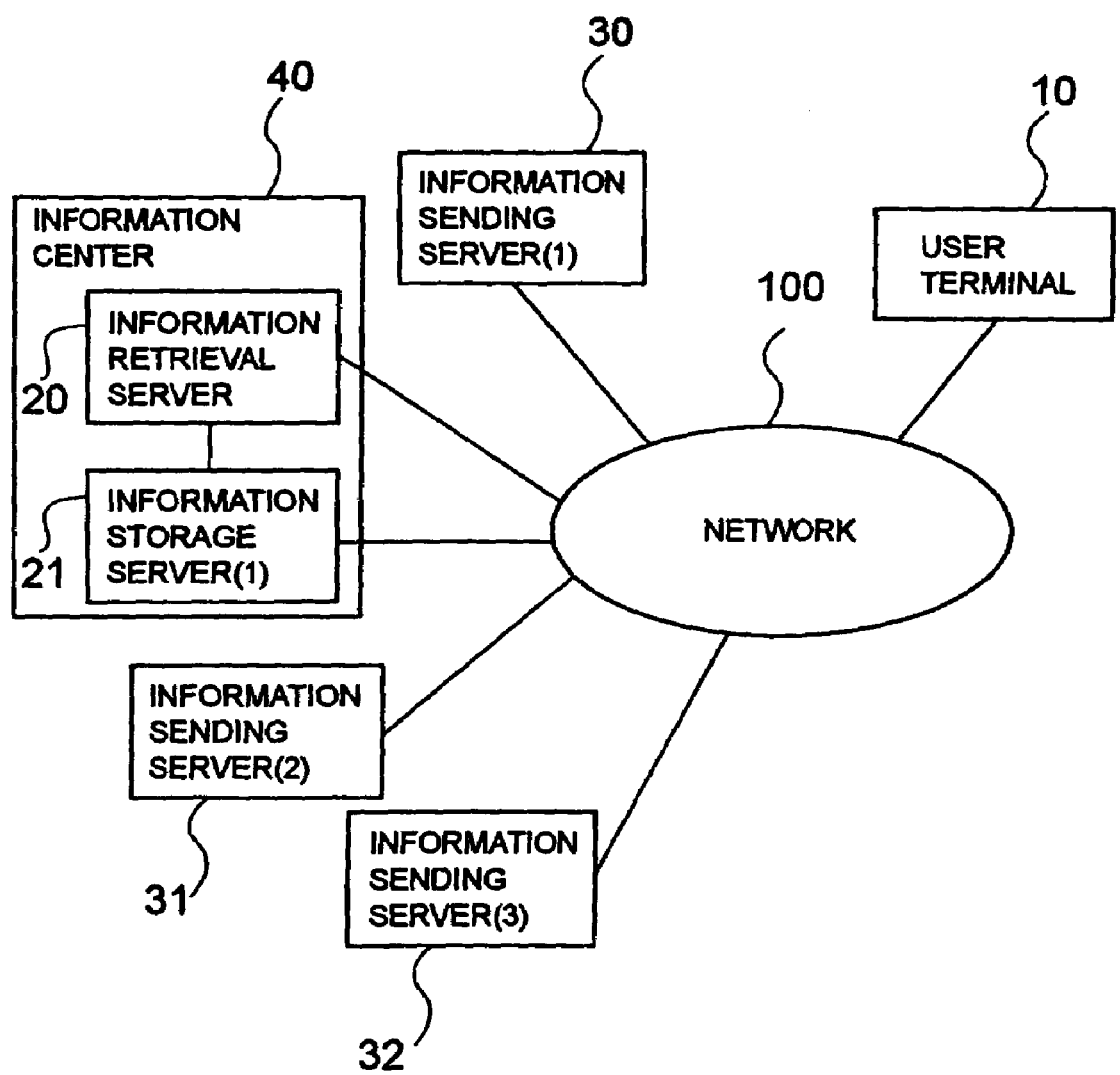
FIG. 1 is a block diagram showing the first embodiment of the present invention.

FIG. 1 is an illustration showing the first embodiment of an information retrieval/information retrieval result providing system and an information retrieval/information retrieval result providing method according to the present invention.

The shown embodiment of information retrieval/information retrieval result providing system according to the present invention is constructed with a user terminal 10, an information center 40, an information retrieving server 20 and an information storage server 21 placed in the information center, an information sending server (1) 30, an information sending server (2) 31 and an information sending server (3) 32 established on a network for presenting information and a network 100 mainly formed with an internet, for connecting respective components.

The user terminal 10 is an information processing unit, such as a personal computer, a mobile terminal and so forth.

The user terminal 10 has an accessing function to an information retrieval service of the information retrieval server 20 and an accessing function to the information storage server (1) 21, in which an information retrieval result is stored. Namely, the user terminal 10 is connected to the network 100 based on the internet and has a function for transmitting and receiving data. Furthermore, the user terminal 10 has a function for transmitting an information retrieval request to the information retrieval server 20 via the network 100 and a function for displaying data on an information retrieval request screen for user transmitted from the information retrieval server 20.

The user registers a keyword relating to information desired to obtain by an information retrieval request item through the user terminal 10 to request retrieval of information presented on the network to the information retrieval server 20. Also, the user terminal 10 has a function for accessing to the information retrieval result provided by the information storage server (1) 21 and a function for transmitting and receiving a user ID and password information issued by the information retrieval server 20, information retrieval completion notice, the information retrieval result and so forth by an electronic mail.

The information center 40 is constructed with the information retrieval server 20 and the information storage server (1) 21. In the information center 40, clerical staff and staff having expertise for implementing editing process of the information retrieval result from the user are assigned, The information retrieval server 20 and the information storage server (1) 21 in the information center 40 are mutually connected across the network in the information center 40, and are also connected to the network 100.

The information retrieval server 20 has a function for transmitting data of information retrieval request screen of the user for the user terminal when access from the user terminal 10 is recognized, a function for recognizing the keyword for information retrieval, which keyword is registered with information retrieval item by the user through the user terminal, a function for collecting information contained in the keyword for information retrieval from the information sending server (1) 30, the information sending server (2) 31 and the information sending server (3) 32, a function for editing information collected depending upon function or the like of the information accessing terminal by recognizing information of search level of information retrieval transmitted from the user terminal, information retrieval result providing format and information accessing terminal, a user interface function required for editing information collected by the clerical staff and the staff having expertise, a user management and authentication function for issuing the user ID and/or password and performing authentication when the user IS and/or password is transmitted from the user, an accounting function for storing a table defining an accounting system and deriving an account according to the accounting system, a transmission function for transmitting data of the information retrieval result obtaining screen to the user terminal when access is demanded from the user terminal, and a function for managing and controlling information storage period relating to storage period after storing the information retrieval result stored in the information storage server 21.

The information storage server (1) 21 stores the information retrieval result collected by the information retrieval server 20 under control by the information retrieval server 20. Furthermore, the information storage period of the stored information retrieval result is controlled by the information retrieval server 20. The information storage server (1) 21 has a function for storing and deleting data of the information retrieval result.

The information sending server (1) 30, the information sending server (2) 31 and the information sending server (3) 32 are managed by business entity, organization and/or individual and are established on the network to provide, transmit or broadcast information.

These user terminal 10, the information retrieval server 20, the information storage server (1) 21, the information sending server (1) 30, the information sending server (2) 31 and information sending server (3) 32 are mutually connected to the network 100.

(Discussion for Operation)

Next, concerning operation of the first embodiment, discussion will be given with reference to FIGS. 1 to 5 and 10.

At first, a procedure upon demanding information retrieval through operation of the user terminal by the user will be discussed.

Figure 2:
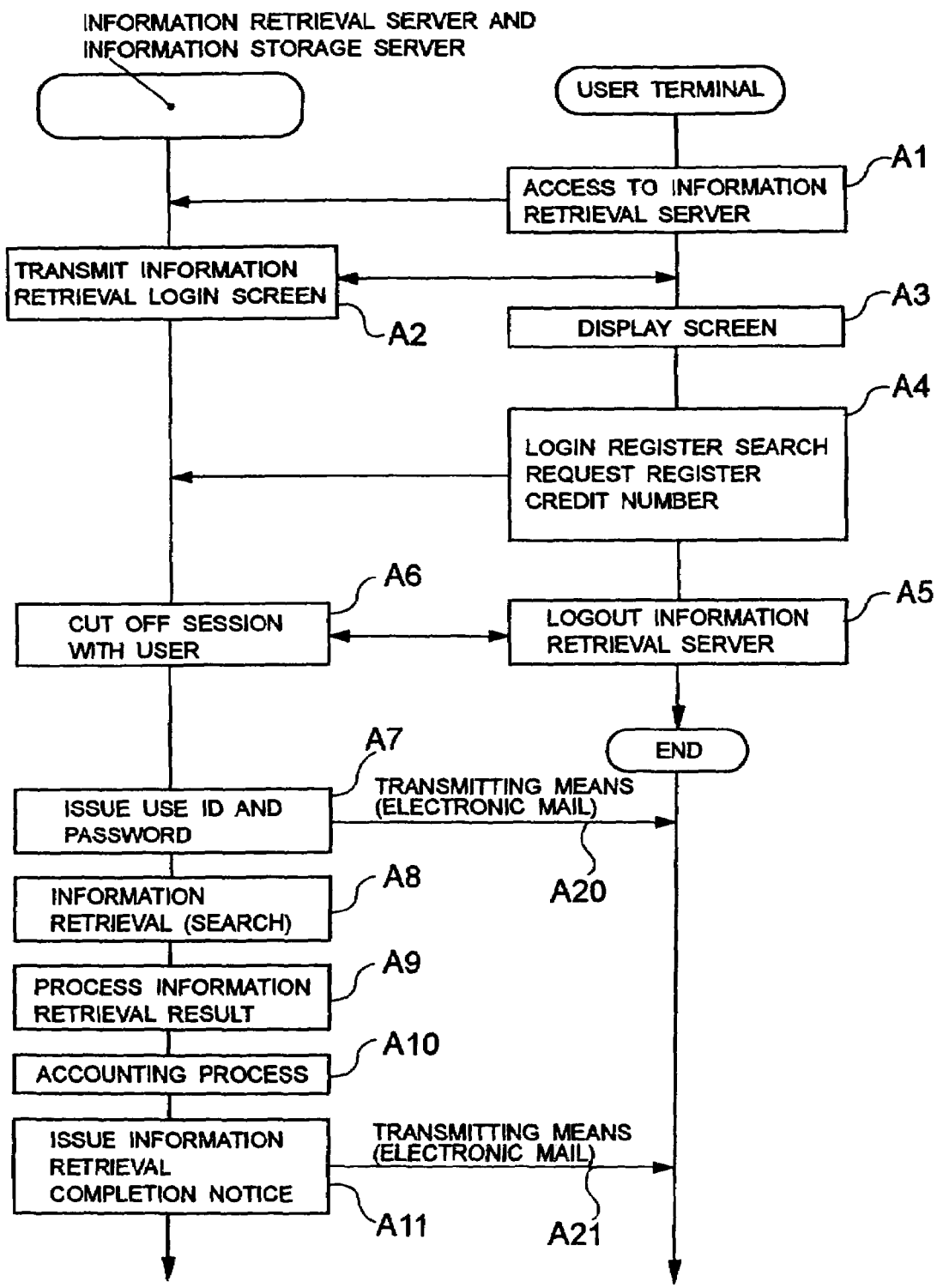
FIG. 2 is an illustration showing operation of the first embodiment of the present invention from information retrieval demand to information retrieval completion notice.

FIG. 2 is an illustration showing a process flow in the case where the user demands information retrieval, and FIG. 3 is an illustration showing an example of an information retrieval register screen displayed on the user terminal.

The user accesses the information retrieval server 20 of the information center 40 established on the network (internet) 100 via the user terminal 10 (step A1). The information center 40 recognizes the access demand from the user terminal 10 and transmits data of an information retrieval registration and login screen to the user terminal 10 (step A2). The user terminal 10 receives the data and displays the information retrieval registration and login screen on a display screen (step A3). On the user terminal 10, an information retrieval registration screen example 50 shown in FIG. 3 is displayed. The user performs declaring and registration to necessary portions observing the information retrieval registration screen example 50.

The user inputs a keyword for information retrieval or explanation relating to the information desired to collect in the information collection request item column 51. Furthermore, the user considers how to effectively use the information retrieval result later to select level from selection items in the search level column 52, such as a declared level, URL level and summary of respective URLs, and only URL level collecting only URL. Furthermore, the user selects desired file format to be presented the information retrieval result, into which the staff assigned to the information retrieval server 20 or the information center 40 edits the result of information retrieval and collection, in an information retrieval result providing format column 53. Also, the user designates a search range for information retrieval in the search range column 54. Furthermore, the user designates a search data up to reception of information retrieval completion notice in a search data column 55. Furthermore, when the information retrieval result is required to be stored temporarily, the user can designate a storage period in the information storage period column 56. Also, the user designates a terminal which is intended to access the information retrieval result in an information accessing terminal column 57. The information retrieval server uses the designated information of the information accessing terminal to customize the present of the information retrieval result.

Also, the user is required to set own name of the user, a card company in contract and credit card number in a credit card number column 58. Designation of individual name, the card company and card number are used for user authentication and accounting process of the information retrieval server 20 and the information storage server 21. Finally, the user registers own electronic mail address 59. The electronic mail address is used for notification of a user ID and password from the information retrieval server, notification of completion of information retrieval, and distribution of information retrieval result through electronic mail.

The user inputs necessary information to the information retrieval registration screen example 50 to transmit the input information to the information retrieval server 20 via the user terminal 10 to log-in the information retrieval server (step A4). The user may log-out after completion of registration of information retrieval to the information retrieval server (step A5). Then, the information retrieval server 20 cuts off the log-in session to the user (step A6).

Next, the information retrieval server 20 recognizes and verifies information in the information retrieval registration screen example 50 transmitted via the user terminal 10 to issue the user ID and password to the registered user (step A7). Here, user ID and password notifying means (step A20) for notifying the user ID and password to the user from the information retrieval server 20 notifies then by the electronic mail. By notification by the electronic mail, the user, the user terminal 10 and the information retrieval server 20 become asynchronous relationship. The user may check the user ID and password notified by the electronic mail from the information retrieval server 20 at different timing or occasion.

Also, the information retrieval server 20 make reference to the keyword and search range 54 in the information collection request item column 51 designated by the user to perform information retrieval (search) for the information sending server (1) 30, the information sending server (2) 31 and information sending server (3) 32 established on the network 100 (step A8). After information retrieval (step A8), the information retrieval server 20 performs an information retrieval result editing process (step A9) with making reference to the search level designated by the user in the search level column 52, information retrieval result providing format set in the information retrieval result providing format column 53 and the information accessing terminal designated in the information accessing terminal column 57. The information retrieval result editing process (step A9) performs automatic process in the information retrieval server 20 and performs process by the staff assigned in the information center 40, if required. On the other hand, after the information retrieval result editing process (step A9), the information retrieval result is stored and maintained in the information storage server (1) 21 in the information center 40.

Next, the information retrieval server 20 performs accounting process for the user (step A10). In the accounting process (step A10) of the information retrieval server 20, reference is made to the accounting method table to estimate account for the user. Concerning request for information retrieval from the user, the information retrieval server 20 make reference to the information of an accounting method table 80 for determining up and down of the account (cost) 81.

FIG. 10 is an illustration showing a content of description in one example of the accounting method table 80. The accounting method table 80 is consisted of a search period 82 for information retrieval, a search result information amount 83, a search technical item 84, a search area 85, a search result edition (manpower) 86, a attached file (reference file) 87 held by the information retrieval result, a search result edition (expertise) 88, a search result storage period 89 and a search storage position 90. In each accounting factor (which generally refer the elements 82 to 90 of FIG. 10), a particular value is set.

When the accounting process (step A10) is completed, the information retrieval server 20 issues the information retrieval completion notice to the user (step A11). Here, information retrieval completion notifying means (step A11) for providing the notice to the user from the information retrieval server 20 is the notice by the electronic mail. By notice with the electronic mail, the user, the user terminal 10 and the information retrieval server 20 becomes asynchronous relationship. The user may check completion of information retrieval notified by the electronic mail at different timing or occasion.

Next, discussion will be given for process procedure (step) upon accessing the information retrieval result by operation of the user terminal by the user.

Figure 4:
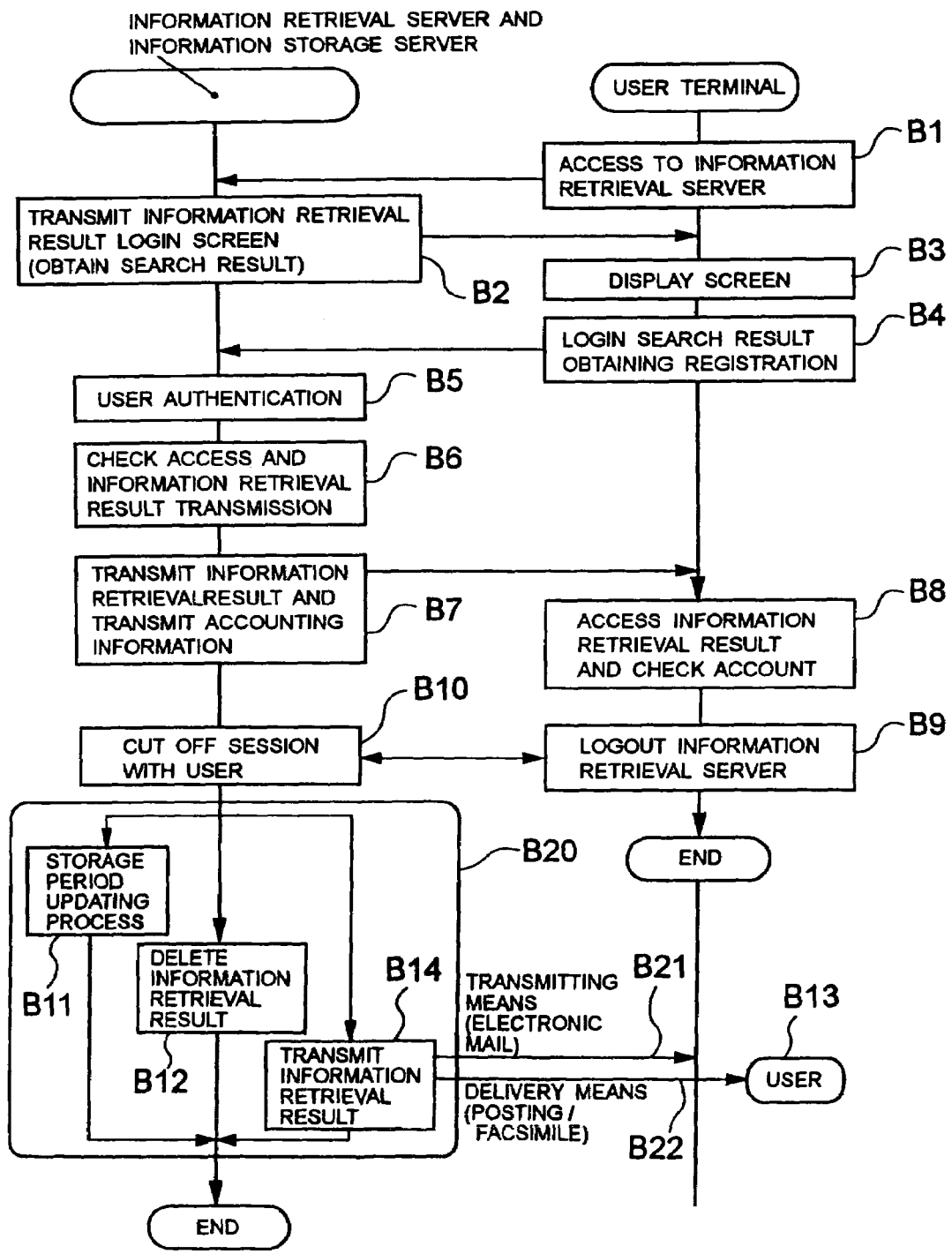
FIG. 4 is an illustration showing operation upon accessing information retrieval result in the first embodiment of the present invention.
Figure 5:
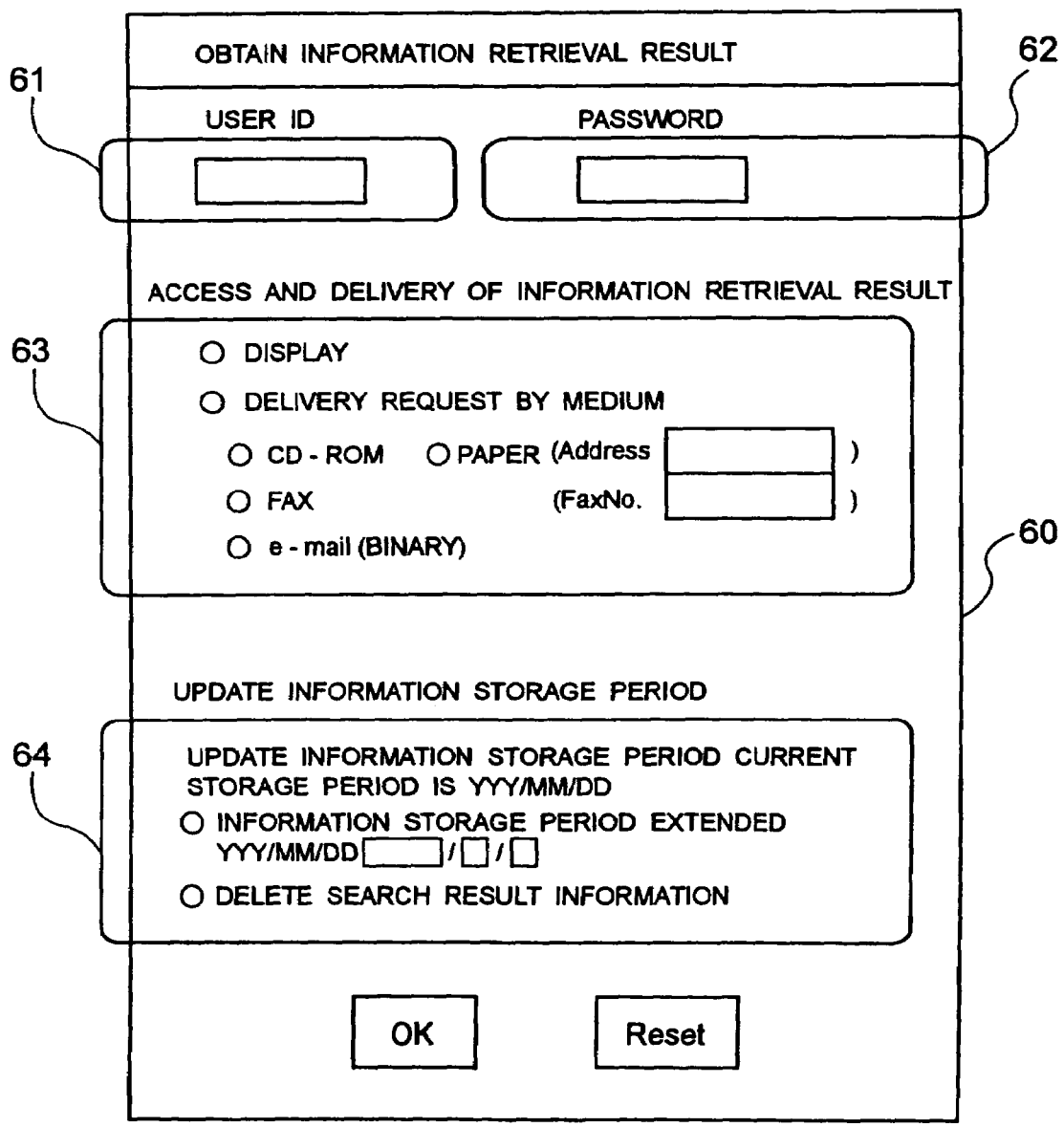
FIG. 5 is an illustration showing an example of display screen to be displayed on the user terminal before accessing the information retrieval result in the first embodiment of the present invention.

FIG. 4 is an illustration showing a process flow of the case where the user accesses the information retrieval result, and FIG. 5 is an illustration showing an example of information retrieval result obtaining screen displayed on the user terminal.

For accessing the information retrieval result, the user accesses to the information retrieval server 20 of the information center 40 established on the network (internet) 100 (step B1). The information center 40 recognizes access demand from the user terminal 10 to transmit the display data of the information retrieval result obtaining screen for the user terminal 10 (step B2). The user terminal 10 receives the display data to display the information retrieval result obtaining screen on the screen (step B3). Then, the information retrieval result obtaining screen example 60 shown in FIG. 5 is displayed in the user terminal 10. The user sets and registers items required to be fill in the setting or writing column in the information retrieval result obtaining screen example 60.

On the information retrieval result obtaining screen example 60, the user ID and the password notified from the information retrieval server upon demanding information retrieval (steps A7 and A20 in FIG. 2) are set in a user ID column 61 and a password column 62 and selects either displaying of information retrieval result access and transmission column 63 or request for delivery by a medium. When the request for delivery with the medium is selected, the information retrieval result which has been present only in the information storage server 21 on the network, can be maintained on the user's hand for effective use. Furthermore, the user may request updating of the storage period in a storage period updating column 64 of the information retrieval result with anticipation of making reference of the information retrieval result again.

Next, the user transmits setting and registration information of the information retrieval result obtaining screen example 60 to log-in the information retrieval server 20 and the information storage server (1) 21 (step B4). The information retrieval server 20 and the information storage server (1) 21 perform user authentication with reference to the transmitted user ID and the password (step B5). Next, the information retrieval server 20 checks the information retrieval result access and transmission column 63 and the information retrieval result storage period updating column 64 designated by the user through the information retrieval result obtaining screen example 60 (step B6). The information retrieval server transmits the information retrieval result to the user terminal and transmits the accounting information (step B7). The user checks access of the information retrieval result and account through the user terminal 10 (step B8). The user notifies completion after accessing of the information retrieval result to the information retrieval server and then logs-out (step B9).

The information retrieval server 20 and the information storage server (1) 21 of the information center 40 cut off the login session with the user (step B10).

The information retrieval server 20 performs a process of the information retrieval result demanded by the user according to the content of the checking of the retrieval result transmission (step B6) (step B20). When the user demands variation of the storage period of the information retrieval result, the information retrieval server 20 performs information retrieval result storage period updating process (step B11). On the other hand, when the user demands deletion of the information retrieval result, the information retrieval server 20 deletes the information retrieval result from the information storage server (step B12). When the user demands media transmission of the information retrieval result, the information retrieval server 20 performs process corresponding to demanded medium (step B14). When the demanded medium is electronic mail, the information retrieval server 20 sends the electronic mail to the electronic mail address of the user (step B21). When the demanded medium is paper, facsimile or CD-ROM, the demanded medium is mailed the demanded medium, i.e. paper or CD-ROM by ordinary mail to the user or transmitted via facsimile. In the alternative, data may be directly transmitted to the user (step B22 and B13).

With the first embodiment set forth above, by installation of the information storage server and declaring of the information storage period, the user is not required to repeat new retrieval when the same information once retrieved is accessed. Namely, it becomes unnecessary to access the information retrieval result from synchronous operation accompanying retrieval operation of the information retrieval server, constantly. Furthermore, by declaring of the search level, necessary minimum information retrieval result can be obtained. Furthermore, by declaring the information retrieval result providing format and declaring access format, such as medium transmission or the like, the information retrieval result can be obtained as format useful for the user to reduce wasting in use of the information retrieval result. Also, upon accessing of the information retrieval result, it becomes unnecessary to care about function of the terminal owned by the user. On the other hand, the user may obtain the information retrieval result as physical medium and thus can effectively use the information retrieval result.

Accordingly, in the circumstance where the information sending servers are shooting up on the network, the user may efficiently perform information collection to have a room to establish a business between the information retrieval server and the information storage server.

Second Embodiment

Next, the second embodiment of the information retrieval/information retrieval result providing system according to the present invention will be discussed with reference to the drawings.

Figure 6:
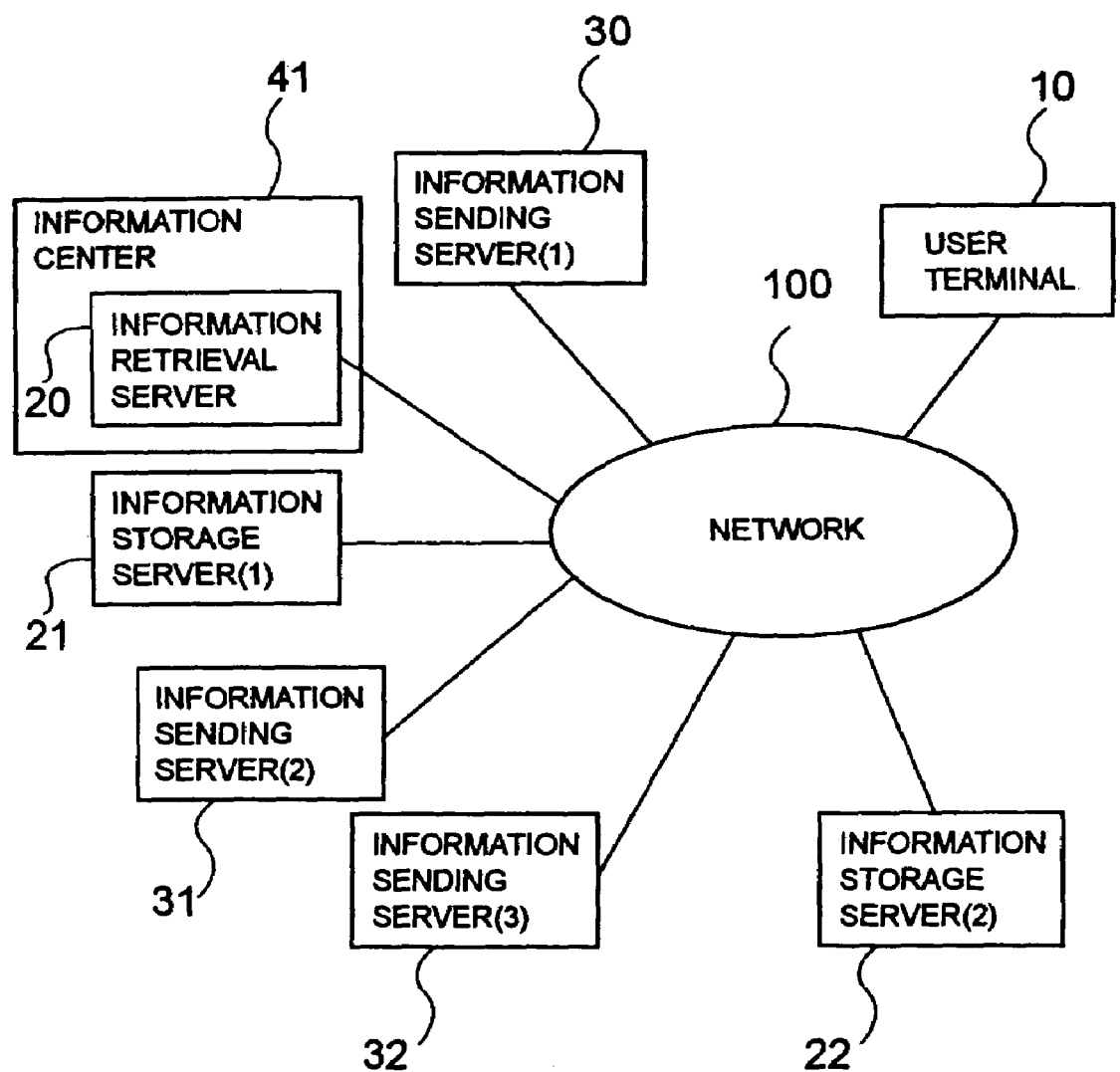
FIG. 6 is a block diagram of the second embodiment of the present invention.

FIG. 6 is an illustration of the second embodiment of the information retrieval/information retrieval result providing system and the information retrieval/information retrieval result providing method according to the present invention.

The second embodiment of the present invention is differentiated from the foregoing first embodiment in that the information retrieval server 20 is present in an information center 41 and the information storage server (1) 20 and the information storage server (2) 21 are distributed on the network.

Accordingly, the information retrieval server 20 in the information center 41 has a function for transmitting the information retrieval result to the information storage server (1) 20 and the information storage server (2) 21 via the network and a function for controlling concerning the information retrieval result stored in the information storage server (1) 20 or the other information storage server (2) 21 through the network. On the other hand, the information storage servers 20 and 21 has a function of receiving and storing the information storage result transmitted from the information retrieval server 20 via the network, a function of deleting the stored information retrieval result under control by the information retrieval server 20, and a function of transmitting the information retrieval result to the user terminal 10.

(Discussion of Operation)

Next, operation of the second embodiment will be discussed with reference to FIGS. 5 to 10.

Figure 7:
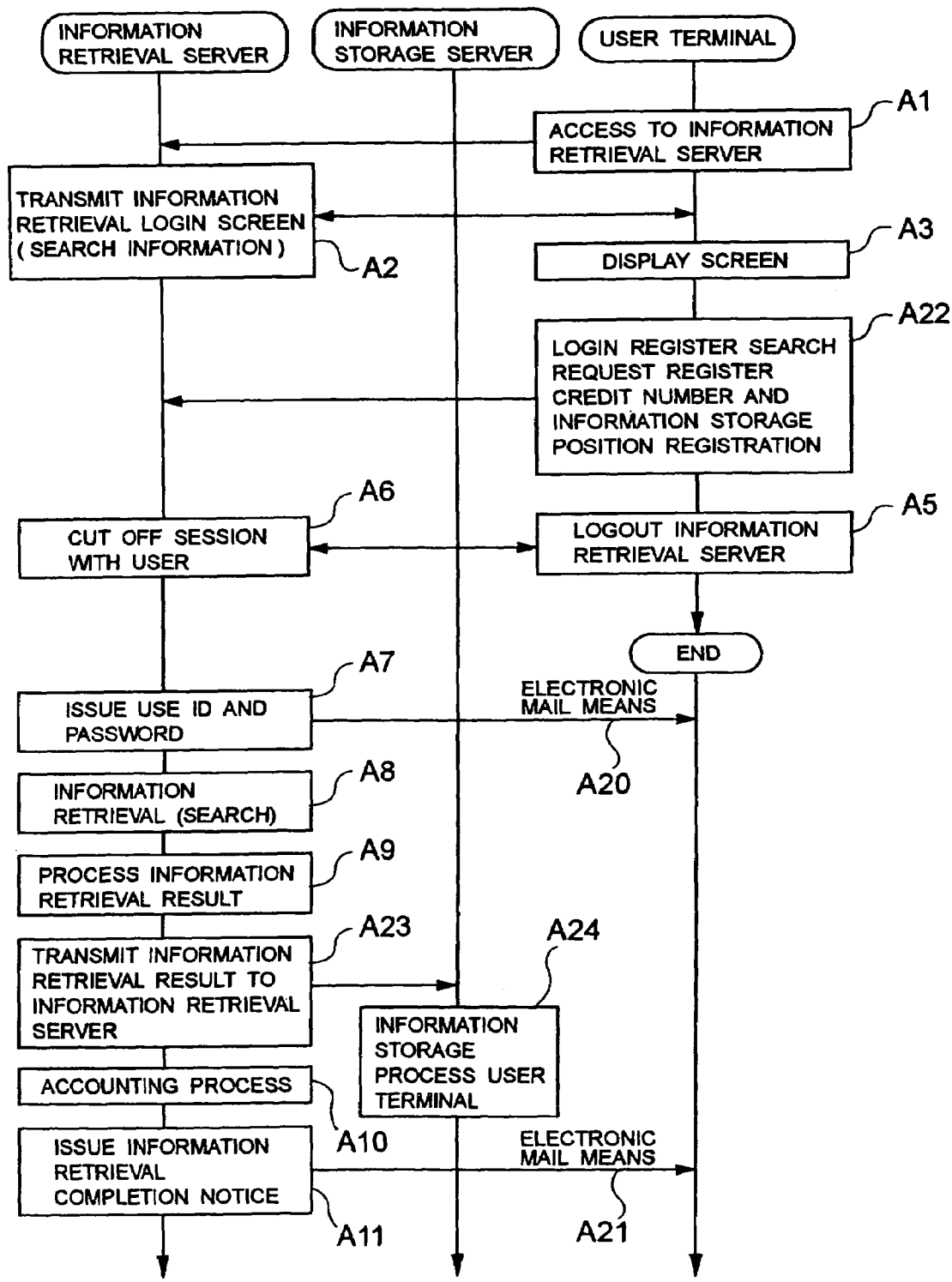
FIG. 7 is an illustration showing operation of the second embodiment of the present invention from information retrieval demand to information retrieval completion notice.

FIG. 7 is an illustration showing a process flow in the case where the user demands information retrieval, and FIG. 8 is an illustration showing an example of the information retrieval registration screen to be displayed on the user terminal. Here, point differentiated from the first embodiment by distributing the information storage servers 21 and 22 concerning the process procedure (steps) upon demanding information retrieval.

The process is the same as the first embodiment from the step where the user accesses the information retrieval server 20 from the user terminal 10 to the step of processing display of the information retrieval registration screen on the user terminal 10 (steps A1 to A3).

The user designates the position of the information storage position column in the information retrieval registration screen example 50 (FIG. 8). Other designation information is similar to the first embodiment. The user transmits data of the information retrieval registration screen example 50 (FIG. 8) to the Information retrieval server 20 via the user terminal 10.

The process is the same as the first embodiment from the step of cutting off the log in session between the user terminal 10 and the information retrieval server 20 to the step of issuing the user ID and the password by the information retrieval server, information retrieval and editing process of the information retrieval result (steps A5 to A9).

The information retrieval server 20 is responsive to completion of the information retrieval result editing process (step A9), according to designation of the information storage position of the information retrieval result from the user (step A22 and 70 of FIG. 8), the information retrieval server 20 transmits the information retrieval result to the information storage server 21 via the network. Here, the user designates the information storage server 21. The information storage server 21 stores the received information retrieval result (step A24). Thereafter, the information retrieval server makes reference to the accounting method table shown in FIG. 10 to implement accounting process for the user to transmit the information retrieval completion notice to the user (steps A10 and A11).

Next, the point different from the first embodiment in the step of accessing of the information retrieval result by the user by distributing the information storage servers 21 and 22 on the network.

Discussion will be given for process procedure (step) upon accessing the information retrieval result by operating the user terminal by the user.

Figure 9:
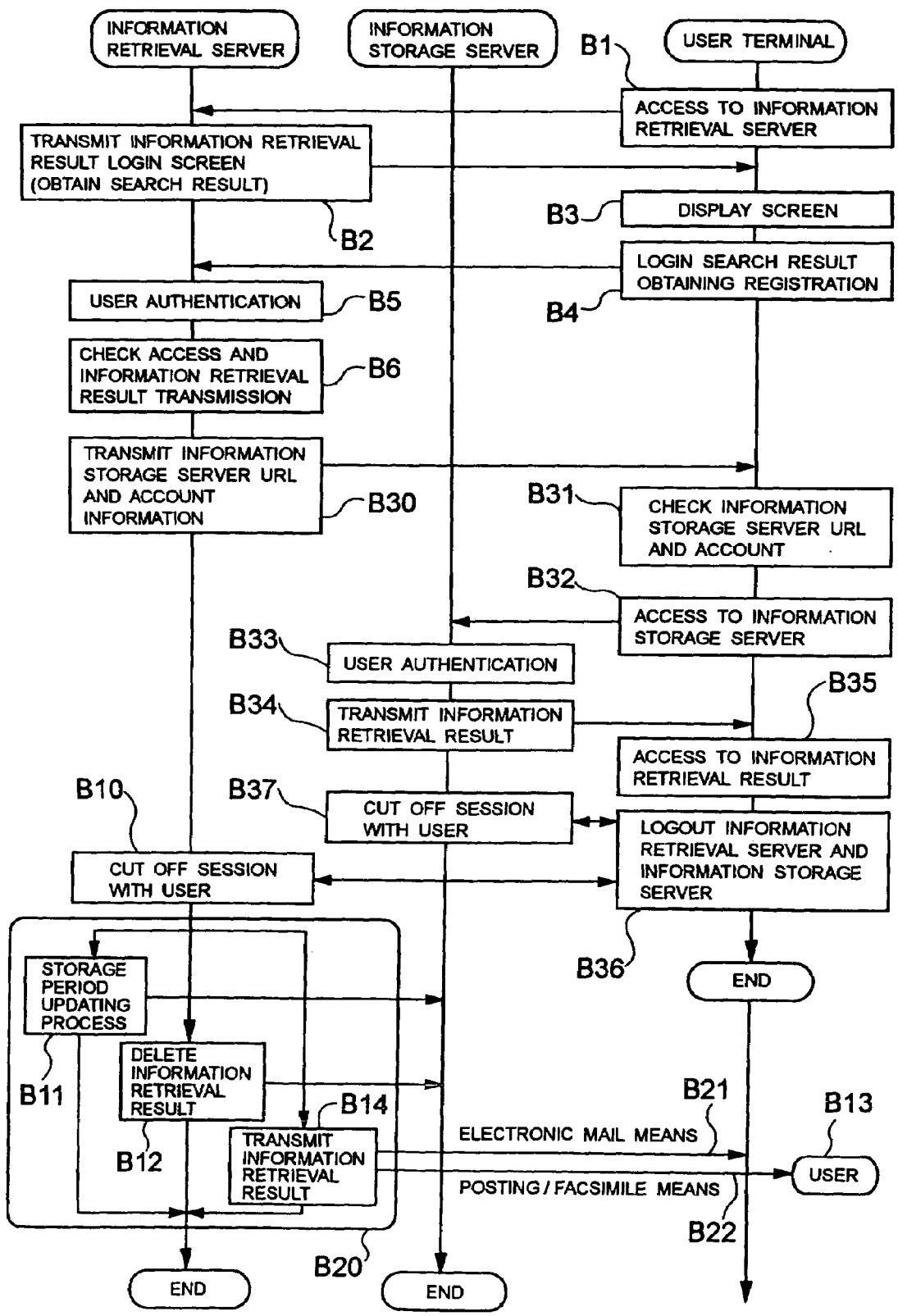
FIG. 9 is an illustration showing operation upon accessing information retrieval result in the second embodiment of the present invention.
Figure 11:
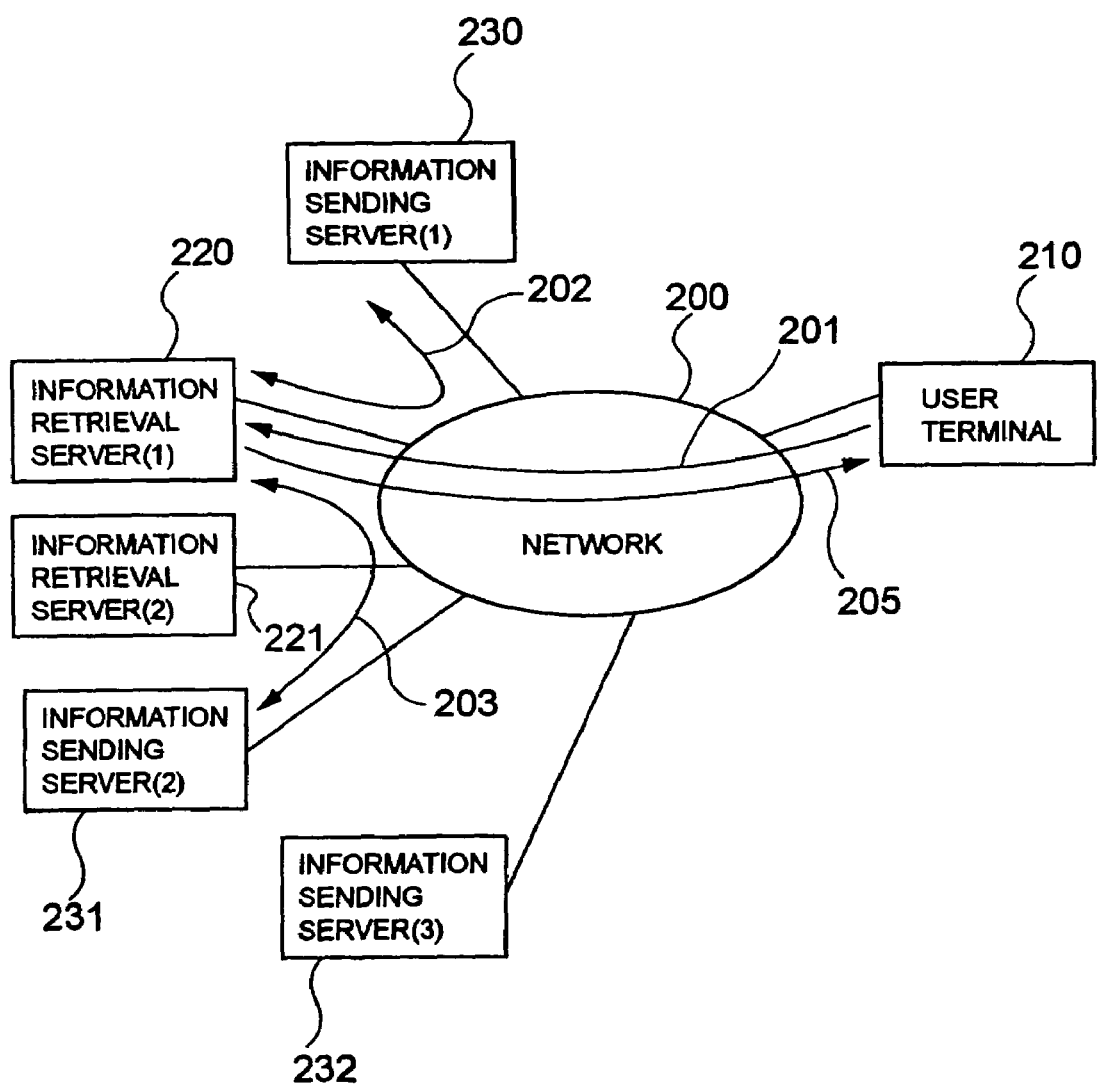
FIG. 11 is a block diagram showing the conventional information retrieval/information retrieval result providing system.

FIG. 9 is an illustration showing the process flow in the case where the user accesses the information retrieval result. The example of the information retrieval result obtaining screen displayed on the user terminal is the same as that shown in FIG. 5.

As a process for accessing the information retrieval result by the user, the processes are the same as the first embodiment for accessing from the user terminal 10 to the information retrieval server 20, transmission of data of the information retrieval result obtaining screen example from the information retrieval server, displaying of the information retrieval result obtaining screen by the user terminal 10, various designation to the information retrieval result obtaining screen example 60 by the user, user authentication by the information retrieval server, and checking of the information retrieval result accessing and transmission column 63 and the information retrieval result storage period updating column 64 designated in the information retrieval obtaining screen example 60 (steps from B1 to B6).

In the second embodiment, the information retrieval server 20 transmits the URL of the information storage server storing the information retrieval result and account information based on the accounting method table to the user terminal (step B30). The user performs checking of the URL of the information storage server and checking of the account information transmitted from the information retrieval server 20 (step B31) and then accesses the information storage server 21 (step B32). The information storage server 21 receiving the access from the user terminal 10 performs user authentication (step B33). Next, the information storage server 21 transmits the information retrieval result to the user terminal 10 (step B34). The user accesses the information retrieval result via the user terminal 10 (step B35). The user notifies completion of access to the information retrieval server 20 and the information storage server 21 distributingly established on the network after access to the information retrieval result (step B36). The information retrieval server 20 and the information storage server 21 cuts off the log-in session with the user (steps B10 and B37).

The information retrieval server 20 performs process of the information retrieval result demanded by the user according to the content of checking of the retrieval result transmission (step B6) (step B20). When the user demands varying of the storage period of the information retrieval result, updating process of the information retrieval result storage is performed for the information storage server 21 (step B15). When the user demands deletion of the information retrieval result, the information retrieval server 20 performs process for deleting the information retrieval result by the information storage server 21 (step B16). When the user demands medium transmission of the information retrieval result, process depending upon the demanded medium is performed (step B14). At this time, the information retrieval server 20 reads out the information retrieval result from the information storage server 21. When the demanded medium is electronic mail, the information retrieval server 20 transmits the electronic mail to the electronic mail address of the user (step B21). When the demanded medium is paper, facsimile or CD-ROM, the demanded medium is mailed by ordinary mail or transmitted by facsimile. In the alternative, data may be directly transmitted to the user (steps B22 and B13).

As set forth, in the second embodiment, in addition to the feature of the first embodiment, since the information storage servers are distributed on the network, the user is not required to care about access timing to the information retrieval result and thus can access the information retrieval result at any time and at any place. Namely, the user may efficiently obtain the information from the network. Even in the condition where the user is moving around inland or to abroad for business trip or the like, the user may obtain the information retrieval result from the information storage server close to the current position which has been designated preliminarily without being affected by traffic condition of the network from the current position of the user to the information storage server. Furthermore, in the second embodiment, since the information storage position can be counted as object for accounting, new business may be established between the user, the information retrieval server and the information storage server.

In the foregoing embodiments, as realizing means, the information retrieval server, the information storage server and the user terminal may be constructed with computers. Respective means shown in FIGS. 1 to 11 and process flow can be realized by control of the computer by software (programs). Accordingly, respective servers and terminals may include storage medium recording the programs.

With the present invention, when the information storage servers are established on the network, it becomes possible to storing of the information retrieval result to the information storage server and designation of the storage period upon demanding the information retrieval to the information retrieval server. Therefore, the user may access the information retrieval result in asynchronous manner to the information retrieval server through the user terminal.

Furthermore, upon accessing the information retrieval result once retrieved, updating of the information storage period is enabled. Furthermore, as required upon demanding information retrieval, the information retrieval result can be obtained in appropriate medium. Therefore, in addition to access to the information retrieval result in asynchronous manner to the information retrieval server, accessible period of the information retrieval result can be arbitrarily extended. Furthermore, use of the information retrieval result in the desired medium to permit effective use of the information retrieval result by the information retrieval server.

On the other hand, with the present invention, when the user demands information retrieval, designation of the search level and search range becomes possible. Also, designation of the information retrieval result providing system becomes possible. Furthermore, the information retrieval result collected by the information retrieval server is organized and edited by staff. Therefore, the user may obtain information, in which the information retrieval result is organized to be required minimum to permit efficient and effective use of the information retrieval result.

On the other hand, since the information storage servers storing the information storage result are distributed on the network to enable designation of the information storage position when the user demands information retrieval to enable obtaining of the information retrieval result from the information storage server close to the user position irrespective of load on the network.

Furthermore, the user declares kind of the information access terminal for accessing the information retrieval result upon demanding information retrieval and the information is provided after process of the information retrieval result into a format adapted to the declared information access terminal. Therefore, various information access terminal can be used to enable access of the information retrieval result at any time and any place.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. An information retrieval/information retrieval result providing method comprising:

accessing an information retrieval server of an information center on a network by operation of a user terminal by a user;

recognizing access from said user terminal by said information retrieval server and transmitting an information retrieval registration screen for permitting the user to request information retrieval by inputting information retrieval items including at least one of a keyword for information retrieval, and presence and absence of storage request of information retrieval result, to the user terminal;

receiving and displaying the information retrieval registration screen by said user terminal;

login to the information retrieval server by transmitting said information retrieval items input to the user terminal by user operation to said information retrieval server;

log-out of user terminal in response to completion of registration of information retrieval request of user by said information retrieval server;

cutting off a login session with the user terminal by said information retrieval server;

recognizing information retrieval items transmitted from the user terminal and issuing a user ID and a password for registered user by said information retrieving server;

performing information retrieval for said information sending server on the network with reference to the information retrieval items by said information retrieval server;

processing the information retrieval result by said information center after information retrieval by said information retrieval server;

storing information retrieval result or information after processing in said information storage server;

performing an accounting process for the user by said information retrieval server;

issuing information retrieval completion notice to the user by said information retrieval server;

accessing said information retrieval server of said information center on the network by operation of a user terminal by a user;

recognizing access from said user terminal and transmitting an information retrieval result obtaining screen for performing information retrieval result obtaining demand by inputting information retrieval result obtaining items including at least one of the user ID, the password, and an access and transmission request to the user terminal by said information retrieval server;

login to said information retrieval server and said information storage server by transmitting said information retrieval result obtaining items input by user operation to said user terminal to said information retrieval server;

performing user authentication by the transmitted user ID and the password by said information retrieval server and said information storage server;

performing accessing process by transmission or delivery of the information retrieval result to the user terminal by said information retrieval server and transmitting accounting information;

displaying information retrieval result and accounting information by said user terminal;

log-out with notifying completion to said information retrieval server after demanding access display or delivery of the information retrieval result by user operation of said user terminal; and cutting off a login session with the user terminal by said information retrieval server and said information storage server in said information center.

2. An information retrieval/information retrieval result providing method comprising:

accessing an information retrieval server of an information center on a network by operation of a user terminal by a user;

recognizing access from said user terminal by said information retrieval server and transmitting an information retrieval registration screen for permitting the user to request information retrieval by inputting information retrieval items including at least one of a keyword for information retrieval, presence and absence of storage request of information retrieval result and designation of information storage server or storage area for storing information storage result, to the user terminal;

receiving and displaying the information retrieval registration screen by said user terminal;

login to the information retrieval server by transmitting said information retrieval items input to the user terminal by user operation to said information retrieval server;

log-out of user terminal in response to completion of registration of information retrieval request of user by said information retrieval server;

cutting off a login session with the user terminal by said information retrieval server;

recognizing information retrieval items transmitted from the user terminal and issuing a user ID and a password for registered user by said information retrieving server;

performing information retrieval for said information sending server on the network with reference to the information retrieval items by said information retrieval server;

processing the information retrieval result by said information center after information retrieval by said information retrieval server;

storing information retrieval result or information after processing in said in said formation storage server designated by the user;

performing accounting process for the user by said information retrieval server;

issuing information retrieval completion notice to the user by said information retrieval server;

accessing to said information retrieval server of said information center on the network by operation of a user terminal by a user;

recognizing access from said user terminal and transmitting an information retrieval result obtaining screen for performing information retrieval result obtaining demand by inputting information retrieval result obtaining items including at least one of the user ID, the password, and an access and transmission request to the user terminal by said information retrieval server;

login to said information retrieval server and said information storage server by transmitting information retrieval result obtaining items input by user operation to said user terminal to said information retrieval server;

performing user authentication by the transmitted user ID and the password by said information retrieval server;

performing user authentication by the transmitted user ID and the password by said information storage server;

performing accessing process by transmission or delivery of the information retrieval result to the user terminal by said information retrieval server and transmitting URL of said information storage server and accounting information;

displaying the URL of said information storage server and accounting information by said user terminal;

accessing said information storage server by user operation to said user terminal;

performing user authentication by said information storage server;

transmitting the information retrieval result to said user terminal by said information storage server;

log-out with notifying completion to said information retrieval server after demanding access display or delivery of the information retrieval result by user operation of said user terminal; and cutting off a login session with the user terminal by said information retrieval server and said information storage server in said information center.

3. An information retrieval/information retrieval result providing method as set forth in claim 1, wherein said information retrieval items include an item for designating a storage period upon demanding temporary storage of the information retrieval result, and said information retrieval result obtaining item includes at least one of an item for requesting updating of said storage period and an item for requesting deletion of the information retrieval result, and wherein said method further comprises:

performing updating process of storage if the information retrieval result or the like with respect to request for varying the storage period by said information retrieval server;

deleting the information retrieval result or the like for the request of deletion of the information retrieval result or the like by said information retrieval server; and performing storage/deletion of said information retrieval result or the like by said information storage server.

4. An information retrieval/information retrieval result providing method as set forth in claim 1, wherein said information retrieval server uses the electronic mail in issuing the user ID and the password for the registered user.

5. An information retrieval/information retrieval result providing method as set forth in claim 1, wherein said information retrieval items include an item of selection of search range and/or search level of the information retrieval, and said information retrieval server makes reference to said information retrieval item designated by the user to perform information retrieval on a plurality of information sending servers established on the network.

6. An information retrieval/information retrieval result providing method as set forth in claim 1, wherein said information retrieval item includes an information retrieval result providing format designated by the user and information accessing terminal designating item, and said information retrieving server makes reference to said information retrieving result providing format and said information accessing terminal to process the information retrieval result.

7. information retrieval/information retrieval result providing method as set forth in claim 1, wherein process of said information retrieval result includes an automatic process by said information retrieval server and a process by staff assigned to the information center.

8. An information retrieval/information retrieval result providing method as set forth in claim 1, wherein an accounting process of said information retrieval server includes estimating the account using an accounting method table having information for accounting process.

9. An information retrieval/information retrieval result providing method as set forth in claim 1, wherein said information retrieval server includes an accounting information by an accounting process, and an accounting method defining table having information of information retrieval period, information amount of information retrieval result, technical item of information retrieval, information retrieval area, editing manpower of information retrieval result, presence or absence of attached file, editing expertise of information retrieval result, storage period of information storage result and storage position of information retrieval result.

10. information retrieval/information retrieval result providing method as set forth in claim 1, wherein said information retrieval completion notice from said information retrieval server to the user is performed by an electronic mail.

11. information retrieval/information retrieval result providing method as set forth in claim 1, wherein, said information retrieval result obtaining screen includes an item for setting a user ID and a password notified from said information retrieval server upon demanding information retrieval and an item of transmission and delivery request of the information retrieval result.

12. An information retrieval/information retrieval result providing method as set forth in claim 1, wherein said information retrieval result obtaining items include a delivery request item as delivery request of the information retrieval result with conversion into an electronic mail, paper, facsimile or CD-ROM,
    wherein when requested medium is the electronic mail, the method further comprises sending the electronic mail to the electronic mail address of the user by said information retrieval server, and
    wherein when requested medium is paper, facsimile or CD-ROM, the method further comprises delivery of the information retrieval result by post mail, facsimile or direct delivery.

13. An information retrieval/information retrieval result providing method as set forth in claim 1, wherein said information retrieval result obtaining items include an item of designating an individual name for user authentication and accounting process, a card company and a card number.

14. An information retrieval/information retrieval result providing method as set forth in claim 1, wherein said information retrieval result obtaining items include an item of registering an electronic mail address of the user, registration of the electronic mail address is used for notification of a user ID and password, information retrieval completion notice, and delivery of electronic mail of the information retrieval result.

15. An information retrieval/information retrieval result providing method as set forth in claim 1, wherein said network comprises the Internet.

16. A storage medium storing a computer program which is executable by a digital processing apparatus for implementing an information retrieval/information retrieval result providing method, said method comprising:
    accessing an information retrieval server of an information center on a network by operation of a user terminal by a user;
    recognizing access from said user terminal by said information retrieval server and transmitting an information retrieval registration screen for permitting the user to request information retrieval by inputting information retrieval items including at least one of a keyword for information retrieval, and presence and absence of storage request of information retrieval result, to the user terminal;
    receiving and displaying the information retrieval registration screen by said user terminal;
    login to the information retrieval server by transmitting said information retrieval items input to the user terminal by user operation to said information retrieval server;
    log-out of user terminal in response to completion of registration of information retrieval request of user by said information retrieval server;
    cutting off a login session with the user terminal by said information retrieval server;
    recognizing information retrieval items transmitted from the user terminal and issuing a user ID and a password for registered user by said information retrieving server;
    performing information retrieval for said information sending server on the network with reference to the information retrieval items by said information retrieval server;
    processing the information retrieval result by said information center after information retrieval by said information retrieval server;
    storing information retrieval result or information after processing in said information storage server;
    performing accounting process for the user by said information retrieval server;
    issuing information retrieval completion notice to the user by said information retrieval server;
    accessing to said information retrieval server of said information center on the network by operation of a user terminal by a user;
    recognizing access from said user terminal and transmitting an information retrieval result obtaining screen for performing information retrieval result obtaining demand by inputting information retrieval result obtaining items including at least one of the user ID, the password, and an access and transmission request to the user terminal by said information retrieval server;
    login to said information retrieval server and said information storage server by transmitting said information retrieval result obtaining items input by user operation to said user terminal to said information retrieval server;
    performing user authentication by the transmitted user ID and the password by said information retrieval server and said information storage server;
    performing accessing process by transmission or delivery of the information retrieval result to the user terminal by said information retrieval server and transmitting accounting information;
    displaying information retrieval result and accounting information by said user terminal;
    log-out with notifying completion to said information retrieval server after demanding access display or delivery of the information retrieval result by user operation of said user terminal; and
    cutting off login session with the user terminal by said information retrieval server and said information storage server in said information center.

17. A storage medium storing a computer program which is executable by a digital processing apparatus for implementing an information retrieval/information retrieval result providing method, said method comprising:
    accessing an information retrieval server of an information center on a network by operation of a user terminal by a user;

recognizing access from said user terminal by said information retrieval server and transmitting an information retrieval registration screen for permitting the user to request information retrieval by inputting information retrieval items including keyword for information retrieval, presence and absence of storage request of information retrieval result and designation of information storage server or storage area for storing information storage result, to the user terminal;

receiving and displaying the information retrieval registration screen by said user terminal;

login to the information retrieval server by transmitting said information retrieval items input to the user terminal by user operation to said information retrieval server;

log-out of user terminal in response to completion of registration of information retrieval request of user by said information retrieval server;

cutting off a login session with the user terminal by said information retrieval server;

recognizing information retrieval items transmitted from the user terminal and issuing a user ID and a password for registered user by said information retrieving server;

performing information retrieval for said information sending server on the network with reference to the information retrieval items by said information retrieval server;

processing the information retrieval result by said information center after information retrieval by said information retrieval server;

storing information retrieval result or information after processing in said in said formation storage server designated by the user;

performing accounting process for the user by said information retrieval server;

issuing information retrieval completion notice to the user by said information retrieval server;

accessing to said information retrieval server of said information center on the network by operation of a user terminal by a user;

recognizing access from said user terminal and transmitting an information retrieval result obtaining screen for performing information retrieval result obtaining demand by inputting information retrieval result obtaining items including at least one of the user ID, the password, and an access and transmission request to the user terminal by said information retrieval server;

login to said information retrieval server and said information storage server by transmitting said information retrieval result obtaining items input by user operation to said user terminal to said information retrieval server;

performing user authentication by the transmitted user ID and the password by said information retrieval server;

performing user authentication by the transmitted user ID and the password by said information storage server;

performing accessing process by transmission or delivery of the information retrieval result to the user terminal by said information retrieval server and transmitting URL of said information storage server and accounting information;

displaying the URL of said information storage server and accounting information by said user terminal;

accessing said information storage server by user operation to said user terminal;

performing user authentication by said information storage server;

transmitting the information retrieval result to said user terminal by said information storage server;

log-out with notifying completion to said information retrieval server after demanding access display or delivery of the information retrieval result by user operation of said user terminal; and cutting off login session with the user terminal by said information retrieval server and said information storage server in said information center.

18. A storage medium as set forth in claim 16, wherein said information retrieval items include an item for designating a storage period upon demanding temporary storage of the information retrieval result, and said information retrieval result obtaining items include at least one of an item for requesting updating of said storage period and an item for requesting deletion of the information retrieval result, and wherein said program further comprises:

performing updating process of storage if the information retrieval result or the like with respect to request for varying the storage period by said information retrieval server;

deleting the information retrieval result or the like for the request of deletion of the information retrieval result or the like by said information retrieval server; and performing storage/deletion of said information retrieval result or the like by said information storage server.

19. A storage medium as set forth in claim 16, wherein said information retrieval server uses the electronic mail in issuing the user ID and the password for the registered user.

20. A storage medium as set forth in claim 16, wherein said information retrieval items include an item of selection of search range and/or search level of the information retrieval, and said information retrieval server makes reference to said information retrieval items designated by the user to perform information retrieval on a plurality of information sending servers established on the network.

21. A storage medium as set forth in claim 16, wherein said information retrieval items includes an information retrieval result providing format designated by the user and information accessing terminal designating item, and said information retrieving server makes reference to said information retrieval result providing format and said information accessing terminal to process the information retrieval result.

22. A storage medium as set forth in claim 16, wherein process of said information retrieval result includes an automatic process by said information retrieval server and a process by staff assigned to the information center.

23. A storage medium as set forth in claim 16, wherein accounting process of said information retrieval server includes estimating the account using an accounting method table having information for accounting process.

24. A storage medium as set forth in claim 16, wherein said information retrieval server includes an accounting information by an accounting process, and an accounting method defining table having information of information retrieval period, information amount of information retrieval result, technical item of information retrieval, information retrieval area, editing manpower of information retrieval result, presence or absence of attached file, editing expertise of information retrieval result, storage period of information storage result and storage position of information retrieval result.

25. A storage medium as set forth in claim 16, wherein said information retrieval completion notice from said information retrieval server to the user is performed by an electronic mail.

26. A storage medium as set forth in claim 16, wherein, said information retrieval result obtaining screen includes an item for setting a user ID and a password notified from said information retrieval server upon demanding information retrieval and an item of transmission and delivery request of the information retrieval result.

27. A storage medium as set forth in claim 16, wherein said information retrieval result obtaining items include a delivery request item as delivery request of the information retrieval result with conversion into an electronic mail, paper, facsimile or CD-ROM,
    wherein when requested medium is the electronic mail, the method further comprises sending the electronic mail to the electronic mail address of the user by said information retrieval server, and
    wherein when requested medium is paper, facsimile or CD-ROM, the method further comprises delivery of the information retrieval result by post mail, facsimile or direct delivery.

28. A storage medium as set forth in claim 16, wherein said information retrieval result obtaining items include an item of designating an individual name for user authentication and accounting process, a card company and a card number.

29. A storage medium as set forth in claim 16, wherein said information retrieval result obtaining items include an item of registering an electronic mail address of the user, registration of the electronic mail address is used for notification of a user ID and password, information retrieval completion notice, and delivery of electronic mail of the information retrieval result.

30. A storage medium as set forth in claim 16, wherein said network comprises the Internet.

* * * * *